United States Patent [19]

Long et al.

[11] Patent Number: 4,621,015

[45] Date of Patent: * Nov. 4, 1986

[54] LOW DENSITY, MODIFIED POLYIMIDE FOAMS AND METHODS OF MAKING SAME

[76] Inventors: John V. Long, 1756 E. Lexington Ave., El Cajon, Calif. 92021; John Gagliani, 6280 Lance Pl., San Diego, Calif. 92120

[*] Notice: The portion of the term of this patent subsequent to Oct. 9, 2001 has been disclaimed.

[21] Appl. No.: 587,020

[22] Filed: Mar. 7, 1984

Related U.S. Application Data

[62] Division of Ser. No. 549,618, Nov. 7, 1983, Pat. No. 4,518,717.

[51] Int. Cl.$^4$ .............................. C08J 9/00; C08J 9/12; B32B 5/18; B32B 5/20

[52] U.S. Cl. ............................ 428/317.7; 156/331.5; 156/331.8; 264/46.4; 264/53; 264/54; 264/DIG. 5; 428/317.1; 428/473.5; 521/183; 521/184; 521/185

[58] Field of Search ............... 264/53, 54, 51, 46.4, 264/46.9, DIG. 5; 521/185, 184, 84.1, 87, 88, 89, 109.1, 113, 117, 183; 428/473.5; 156/331.3, 331.5, 331.8

[56] References Cited

U.S. PATENT DOCUMENTS

| Re. 31,756 | 12/1984 | Gagliani et al. | 521/184 X |
|---|---|---|---|
| 2,915,788 | 12/1959 | Engel | 264/126 X |
| 3,089,857 | 5/1963 | Pottenger | 264/53 X |
| 3,192,294 | 6/1965 | Streed et al. | 264/126 X |
| 3,259,677 | 7/1966 | Zwick | 264/126 |
| 3,301,929 | 1/1967 | Bruun | 264/126 |
| 3,375,209 | 3/1968 | Kemper | 264/53 X |
| 3,455,483 | 7/1969 | Enklaar | 264/126 X |
| 3,581,342 | 6/1971 | Dietzel et al. | 264/126 X |
| 3,779,858 | 12/1973 | Hiss et al. | 428/473.5 X |
| 3,793,281 | 2/1974 | Acle, Jr. | 521/185 X |
| 3,843,757 | 10/1974 | Ehrenfreund et al. | 264/53 |
| 3,899,626 | 8/1975 | Steffen | 428/473.5 |
| 3,917,761 | 11/1975 | Scheuerlein et al. | 264/49 X |
| 3,930,097 | 12/1975 | Alberino et al. | 428/473.5 X |
| 4,061,812 | 12/1977 | Gilwee, Jr. et al. | 428/473.5 X |
| 4,070,312 | 1/1978 | Gagliani et al. | 521/185 X |
| 4,100,140 | 7/1978 | Zahir et al. | 428/473.5 X |
| 4,161,477 | 7/1979 | Long et al. | 528/229 X |
| 4,183,838 | 1/1980 | Gagliani | 528/229 X |
| 4,183,839 | 1/1980 | Gagliani | 528/229 X |
| 4,233,258 | 11/1980 | St. Clair | 428/473.5 X |
| 4,238,538 | 12/1980 | Manwiller | 264/126 X |
| 4,266,919 | 5/1981 | Dunnington et al. | 264/126 X |
| 4,299,946 | 11/1981 | Balme et al. | 428/473.5 X |
| 4,302,413 | 11/1981 | Howe et al. | 264/126 |
| 4,303,779 | 12/1981 | Stenzenberger | 428/473.5 X |
| 4,305,796 | 12/1981 | Gagliani et al. | 521/915 X |
| 4,361,453 | 11/1982 | Gagliani et al. | 264/45.3 X |
| 4,369,261 | 1/1983 | Gagliani et al. | 521/185 X |
| 4,394,464 | 7/1983 | Gagliani et al. | 521/184 X |
| 4,407,980 | 10/1983 | Gagliani et al. | 264/46.4 X |
| 4,425,441 | 1/1984 | Gagliani et al. | 264/46.5 X |
| 4,426,463 | 1/1984 | Gagliani et al. | 521/185 X |
| 4,444,823 | 4/1984 | Gagliani et al. | 428/473.5 X |
| 4,468,431 | 8/1984 | Okey | 428/473.5 X |
| 4,476,254 | 10/1984 | Long et al. | 521/185 X |
| 4,518,717 | 5/1985 | Long et al. | 521/184 X |
| 4,546,115 | 10/1985 | Gagliani et al. | 521/184 X |

OTHER PUBLICATIONS

McKelvey, James M., *Polymer Processing*, New York, John Wiley and Sons, c1962, pp. 1-4.

*Primary Examiner*—Philip Anderson
*Attorney, Agent, or Firm*—Frank D. Gilliam

[57] ABSTRACT

Methods of making low density modified polyimide/-polyimide-amide foams and the resulting compositions. An N-substituted aliphatic imide is prepared by reacting a suitable aromatic dianhydride with a suitable oxime. A polyimide forming material is prepared by dissolving the N-substituted aliphatic imide in an esterifying solvent, then adding a suitable aromatic diamine. This material is dried to a powder. A suitable hydrated compound which is stable up to at least about 100° C. is mixed with the powder. A foam is then produced by heating the material to reaction temperature for a period sufficient to produce a stable foam. The material melts, then spontaneously expands into a foam which becomes self supporting and cures to a resilient flexible foam. The addition of the hydrated compound is found to result in an exceptionally low density foam. Depending upon heating conditions, a polyimide, polyimide-amide or mixture thereof may be produced, resulting in foams having selectively variable physical properties.

8 Claims, 1 Drawing Figure

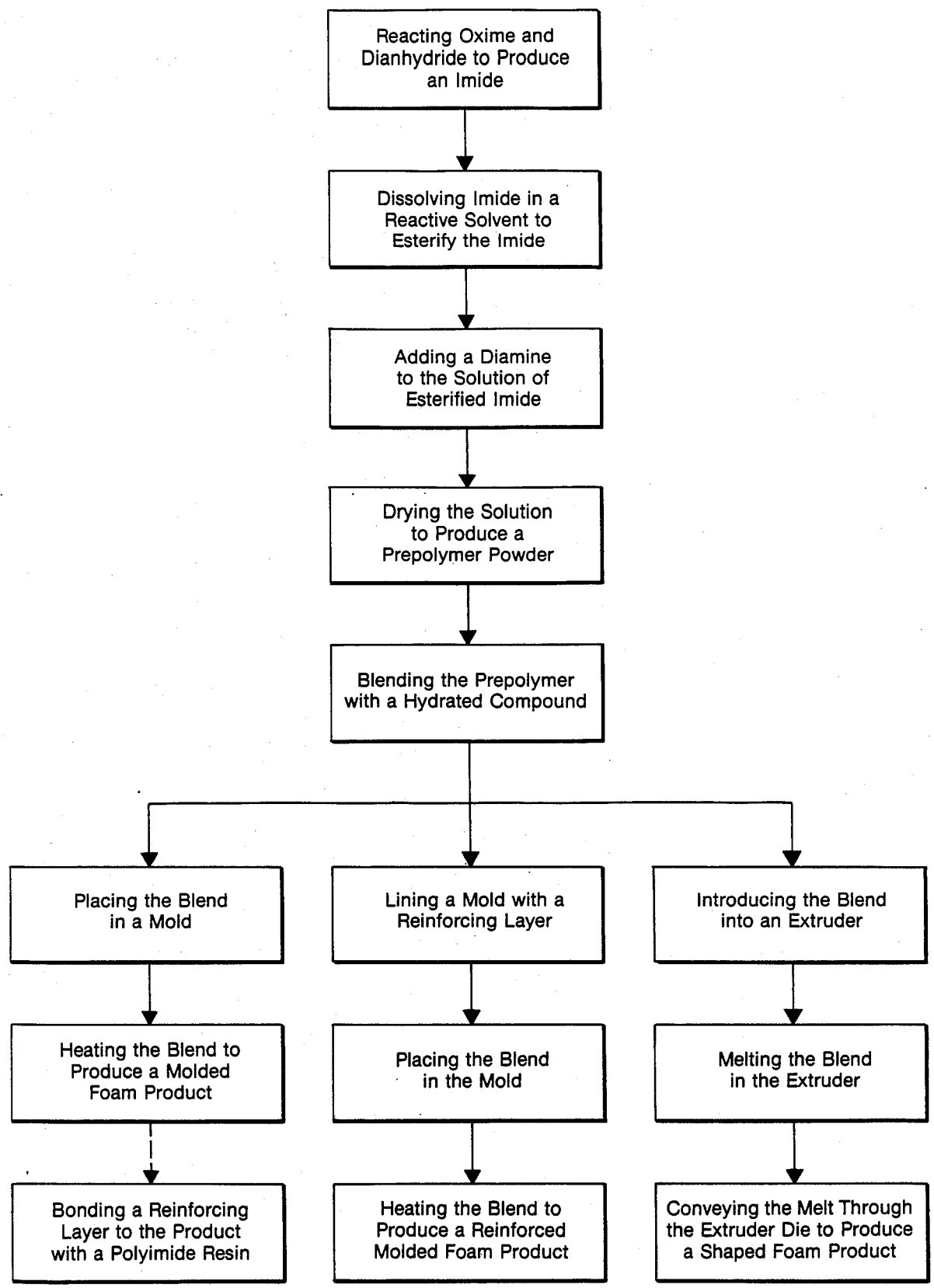

LOW DENSITY, MODIFIED POLYIMIDE FOAMS AND METHODS OF MAKING SAME

This is a division of application Ser. No. 549,618, filed Nov. 7, 1983, and now U.S. Pat. No. 4,518,717.

BACKGROUND OF THE INVENTION

This invention relates in general to polyimide resins and, more specifically, to compositions and methods for making low density resilient, flame resistant modified polyimide and polyimide-amide foams.

Prior U.S. Pat. Nos. 4,161,477, 4,183,838 and 4,183,839 disclosed and claimed certain polyimide compositions which are flame resistant and useful as coatings and adhesives.

The coating and adhesive compositions described in the above-mentioned prior patents are made by first preparing a suitable bisimide by reacting an aromatic tetracarboxylic acid dianhydride with a cyclic amide or oxime. The ratio of oxime to dianhydride is preferably in the 2.3:1 to 2.7:1 range and the imidization reaction is preferably conducted at a temperature of 170°-200° C. for 20-60 minutes.

The polyimide forming material is then prepared by dissolving the bisimide in an inert solvent; then adding thereto a suitable diamine, producing a viscous fluid containing an intimate, unpolymerized mixture of N-substituted cyclic bisimide dicarboxlyic acid and diamine which is capable of being converted to a high molecular weight polymer by the application of heat.

The solution is coated onto a surface and polymerized by heating to a temperature in the 177°-316° C. range for 30 minutes to 5 hours. The following is exemplary of the exchange reaction which occurs:

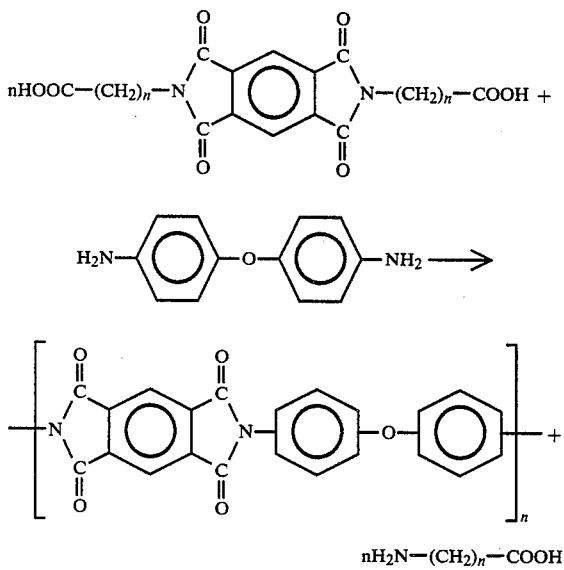

where n is a positive integer.

The resulting coating is tough, highly adherent to various surfaces, with very few pinholes or bubbles. It has excellent peel strength and is resistant to high temperatures, peeling and abrasion.

The prior coating material, however, was not suitable for use in applications requiring a cellular or foam material, since conventional agitation foaming and addition of known blowing agents add to process costs and complexity and are not entirely effective at the relatively high polymerization temperature required. Also, the density and volume weight of the prior foams tended to be undesirably high, especially in weight sensitive aircraft and space application.

Our prior U.S. Pat. No. 4,407,980 discloses methods of making superior modified polyimide foams. However, even these foams did not have the optimum low density characteristics necessary for many low weight structural applications.

SUMMARY OF THE INVENTION

We have now found that, by suitably varying reaction conditions and certain ingredients, within specified limits, materials similar to those described above and in the cited prior patents can be used to produce a resilient, flame resistant, modified polyimide cellular structure having particularly low density. For the purposes of this application, "modified polyimide" will be used to mean a mixture of polyimide and polyimide-amide resins varying from almost entirely polyimide to almost entirely polyimide-amide.

The basic steps in producing our improved resilient foam are reacting a suitable aromatic dianhydride with a suitable oxime in a ratio to dianhydride up to about 1.5:1 and 0.05:1 to produce a monoimide (excessive quantities of bisimide are produced above 1.5:1, which are not suitable for the foaming reaction), dissolving this mixture in a reactive solvent which is an esterifying agent, to esterify the imide, adding a suitable diamine and any desired additives, drying the solution to a powder mixing with the powder a hydrated compound which is stable at temperatures up to at least about 100° C. and finally heating the material to a temperature sufficient to cause the dry material to melt and spontaneously foam. The heating causes the dry material to simultaneously undergo a condensation reaction and/or an exchange reaction. The condensation reaction produces water and alcohol vapors which cause the molten mass to expand. The water of hydration of the added hydrated compound further enhances the foaming action, producing a much lower density foam than occurs without the additive. Apparently, the water of hydration is released and vaporizes at the foaming temperature, causing an increase in cell size. As the reactions proceed, the molten mass forms a cellular structure which becomes self-supporting and finally cures to an imide and/or an imide-amide polymer depending on heating conditions.

BRIEF DESCRIPTION OF THE DRAWING

Details of the invention will be further clarified upon reference to the drawing, wherein the FIGURE is a flow diagram illustrating the basic process for making the foamed product of this invention and preferred variations thereof.

DETAILED DESCRIPTION OF THE INVENTION

As seen in the drawing, the basic process for making the foam product of this invention, including several variations thereof, is illustrated in a block flow diagram.

The process steps which produce our novel products begins with reacting an oxime and a dianhydride to produce an imide. Details of the reaction and of suitable oximes and dianhydrides are provided below, as are details of the other steps illustrated in the drawing. The imide produced in the first step is dissolved in a reactive solvent to esterify the imide. To that solution of esterified imide is added a diamine and the solution is dryed to produce a prepolymer powder. The prepolymer powder is then blended with a hydrated compound. The resulting powder is ready to be melted, heated and foamed by means of any suitable shaping means to produce a shaped product, as described in detail below.

Three methods of shaping and, if desired, applying a reinforcing layer to the surface of the product are shown in the flow diagram. In a first alternative, the blended powder is placed in a mold and heated to foam, resulting in a shaped foam product. Optionally, a reinforcing layer may be bonded to the surface of the product.

In a second shaping method, a mold is lined with a reinforcing material, then the blended powder is introduced thereinto. Upon heating, a foamed product bonded to the reinforcing layer results.

In a third shaping alternative, the blended powder is introduced into a conventional extruder, heated to melt and extruded through a die to produce a shaped product. Any suitable extruder of the great many known extruders may be used.

Any suitable aromatic dianhydride may be used in the preparation of the desired imides. Typical aromatic dianhydrides include those described and referenced in the patents listed above. Due to their ready availability at reasonable prices and the excellent foams which result, pyromellitic dianhydride and 3,3', 4,4' benzophenone tetracarboxylic acid dianhydride (BTDA) are preferred.

Any suitable oxime may be reacted with the selected dianhydride to produce the desired imide. Preferably, the oxime has the general formula:

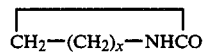

where "x" is a positive integer from 1 to 5. Of these, best results are obtained with caprolactam because larger ring structures tend to open with heat and react with the aromatic dianhydride.

While any suitable reaction conditions may be used, we have obtained the best results where the dianhydride is added to the oxime and the mixture is heated to about 120°-320° C. until imidization is complete, about 10-60 minutes. Optimum results have been obtained at about 180° C. for about 30 minutes.

In order to produce a superior foaming material, we have found that it is essential that the mole ratio of oxime to dianhydride be up to about 1.5:1. Above this range, the material forms a coating without foaming. Very small proportions of oxime are effective to catalyze the reaction, producing a more rigid foam which is preferred for some applications. The quantity of oxime is selected to be effective in producing foam of desired physical characteristics. Within this range, optimum results occur with a mole ratio of oxime to dianhydride is in the range of about 1.0 to 0.05 oxime to 1 dianhydride. Within this range, the compressive resistance of the foam increases with decreasing ratios of oxime. This property is important in providing foams of various compressive resistance values for use in various specific applications. We have found the ideal combination use caprolactam as the oxime and BTDA as the dianhydride. The compressive resistance value required for a given application can be selected simply by selecting the appropriate quantity of caprolactam. The polymers produced by the above reaction have the general formula:

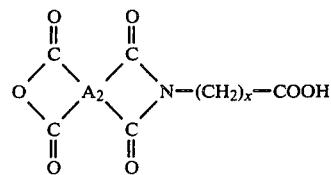

wherein "x" is an integer from 1 to 5 and "$A_2$" is selected from the group consisting of:

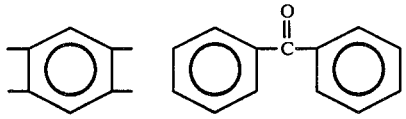

and mixtures thereof.

The imide thus produced is then esterified by dissolving it in a suitable reactive solvent at a suitable temperature. Any suitable reactive solvent which acts as an esterifying agent may be used. Typical of these are aliphatic alcohols having up to 7 carbon atoms and aromatic alcohols, which may have halogen or amino substitutions and mixtures thereof. Best results have been obtained with methyl alcohol. The esterification reaction takes place as follows:

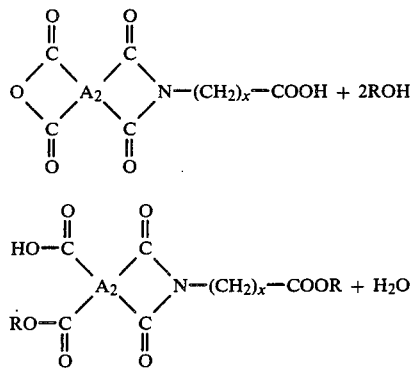

wherein "x" is an integer from 1 to 5, "$A_2$" is as listed for the imide above and "R" is an aliphatic or aromatic radical which may have halogen or amino substitutions. This esterification may take place under any suitable conditions. Typically, a mole ratio of imide to esterifying agent of from about 1:8 to 1:15 is preferred to assure rapid esterification at reflux temperature. This solution is heated to reflux (about 70°-80° C.) until clear, which takes about 60-90 minutes.

Once the esterification is complete, the selected diamine or diamines are added to the solution. Preferably, an approximately stoichiometric quantity of diamine is used.

Any suitable diamine may be used. Typical diamines include meta-phenylene diamine, para-phenylene diamine; 4,4'-diaminodiphenyl ether, 4,4'-diaminodiphenyl sulfone, 3,3'-diaminodiphenyl sulfone, 4,4'-diaminodiphenyl sulfide, 4,4'-diaminodiphenyl methane, 3,3'-diaminodiphenyl methane and mixtures thereof. Of these, best results are obtained with 4,4'-diaminodiphenyl methane which is, therefore, preferred. If desired aliphatic diamines may be used in combination with these aromatic diamines. Typical aliphatic diamines include 1,3 diamino propane, 1,4 diamino butane, 1,6-diamino hexane, 1,8-diamino octane, 1,12 diamino dodecane and mixtures thereof.

Additives to improve various characteristics of the final foam may be added as desired. Any appropriate additives may be used, such as fillers. surfactants to improve uniformity of the cellular structure, ultraviolet absorbers or the like. Typical surfactants include Dow Corning Corp. 190 or 193, (a silicone surfactant), FC430 from Minnesota Mining & Manufacturing Co., Zonyl FSC from E. I. dePont de Nemours & Co., and L550 from Union Carbide Corp. Non ionic surfactants of the polyoxyethylene alcohol family, or derivatives thereof are also recommended and include Tergitol from Union Carbide and Triton Rohn and Haas. While any suitable concentration may be used, from about 0.01 to 2% (by weight, based on the weight of the solution prior to drying) is preferred.

The solution is then dried by any suitable method. Simply heating the solution in an oven to a temperature of about 65°–95° C. until dry is satisfactory. Other conventional methods, such as spray drying, rotary drying, thin film evaporation, etc. may be used as desired. The resulting free-flowing powder or flakes may be further ground or treated as desired and may be stored indefinitely at room temperature.

Any suitable compound containing water of hydration and being stable (i.e., resistant to having the water of hydration driven off or of otherwise degrading) up to at least about 100° C. may be blended with the prepolymer powder to improve the foam. Typical hydrated, temperature resistant, compounds include lactose.$H_2O$, hydroxybenzophenone.$H_2O$, meta sulfobenzoic acid.2-$H_2O$, para sulfobenzoic acid.3$H_2O$, ortho sulfobenzoic acid.3$H_2O$, oxalic acid.2$H_2O$, trihydroxybenzoic acid.$H_2O$, gallic acid.$H_2O$ and mixtures thereof. Of these, best results are obtained with oxalic acid.2$H_2O$ because it decomposes above 180° C. and leaves no residue.

Any suitable quantity of the hydrated compound may be used. Typically, good results are obtained with from about 0.05 to 10 wt. % of the additive based on prepolymer powder weight. Within this range, about 0.5 to 5 wt. % additive is optimum.

The hydrated compound should be well dispersed through the prepolymer. Typically, the blending can be accomplished by mechanical mixing. Mixing from about 2 to 20 minutes gives good results.

The final step in converting the powder into a foam is accomplished by heating the powder to the selected foaming temperature for a suitable period.

The reaction which takes place is quite complex, since it is a combined condensation and exchange reaction. When the exchange reaction is forced to completion by higher temperatures and/or prolonged heating, in the range of 230°–315° C. for 30–60 minutes (optimally, about 260° C. for about 45 minutes) the polyimide structure is primarily formed as shown by the following general reaction:

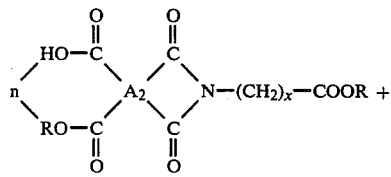

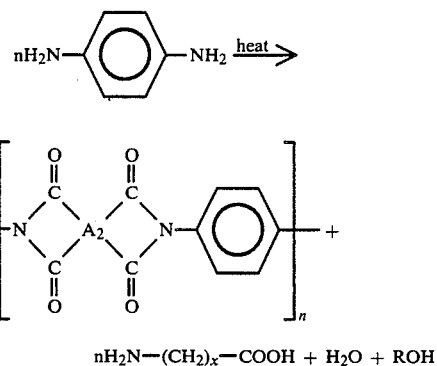

where "x" is an integer from 1 to 5 and $A_2$ is as listed for the imide above.

If, however, the exchange reaction is stopped prior to completion the products of the intermediate condensation reaction will still be present, so that a variable (depending on reaction time, temperature and conditions) amount of a polymer having the following imide-amide structure will remain:

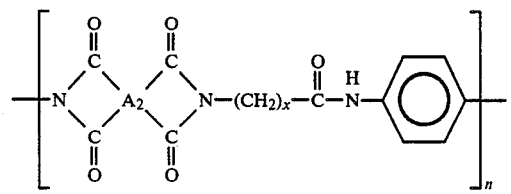

where "x" is an integer from 1 to 5 and $A_2$ is a radical as listed for the imide above.

As the powder is heated it first melts and, as the condensation reaction begins, water and alcohol are released and vaporized, causing the molten mass to expand. Meanwhile, the water of hydration of the hydrated compound additive is released and vaporizes, further aiding the foaming action, increasing the number and size of cells to reduce foam density. The resulting cellular structure becomes self-supporting and finally cures to an imide and imide-amide polymer, with proportions of the two polymers depending on heating (time and temperature) conditions. The resulting foam is tough, resilient and will not emit significant smoke or toxic by-products when exposed to open flame.

Where substantially entirely imide-amide foam is desired, heating should be at from about 120° C. to about 220° C. for about 10 to 40 minutes, with optimum results at about 200° C. for about 30 minutes. As temperature is increased above this range (and the somewhat longer heating period is used) the proportion of polyimide will increase. The foam is more flame resistant, but less flexible, with the higher proportion of polymide. Thus, by varying heating conditions flexibility and flame resistance can be tailored to meet specific requirements.

The powder may be heated by any suitable heating method in any suitable mold or shaping means. Typical heating methods include heating by conduction through mold walls, by convection in an oven, by infra-red radiation or the like, with microwaves or any suitable combination thereof. The powder may be heated in open, closed, tubular, etc. molds, as a sheet on a continuously moving mold surface, in an extrusion device or any other suitable arrangement. During foam expansion, the foam may be prevented from adhering to molding by non-adherent surfaces. Alternatively, the foam may be allowed to bond to a surface during expansion. Typically, a reinforcing fabric, such as fiberglass cloth may be placed in a mold and bonded to the foam during expansion to provide a smooth surface.

After a foam product is produced, such as the tube or pipe described above, a reinforcing material such as fiberglass fabric may be bonded to the product surface. We have found that an excellent reinforced foam product can be produced by coating the foam surface with a conventional polyimide resin, applying the reinforcement thereto and heating to cure the resin. Alternatively, a fabric may be impregnated with the resin, which is then wrapped around the foam and the resin is cured. Our foam does not suffer any degradation of physical properties at the resin cure temperatures and produces an excellent bond.

Details of the invention will be further understood upon reference to the following examples, which describe preferred embodiments of the methods and compositions of this invention. All parts and percentages are by weight, unless otherwise indicated.

EXAMPLE I

Two foaming tests are undertaken, the first without the addition of a compound possessing water of hydration and the other with the compound. The test without the additive is as follows: About 120.8 g. (0.375M) of 3,3',4,4'-benzophenonetetracarboxylic acid dianhydride (BTDA) and about 28.29 g. (0.25M) caprolactam are placed in a one liter flask and heated to about 175° C. After about 30 minutes at this temperature the mixture is cooled to about 50° C. and about 100 g. of ethanol is added. This mixture is heated to reflux temperature (about 75° C.). Reflux is continued until the mixture appears clear, about 70 minutes. The mixture is cooled to just below about 70° C. and about 75 g. (0.375M) 4,4'-diaminodiphenyl methane is added. This mixture is refluxed (at about 75° C.) for about 15 minutes, then is cooled to room temperature and coated onto aluminum foil. The coating has a heavy, syrup-like consistency, with a thickness of about 20–40 mils. The coating is dried for about 3 hours at about 65° C. The dry powdery residue is removed from the foil and placed in an oven pre-heated to about 260° C. After about 45 minutes of heating, the material is found to have expanded into a flexible, resilient foam sheet having a homogenous cellular structure. The density of this foam is found to be about 0.8 lb/ft$^3$. The above experiment is repeated with the only difference being the addition of about 2 g. hydrated oxalic acid (HOOCCOOH.2H$_2$O) per 100 g. of the dry powder residue. The additive is blended with the powder in a blender for about 10 minutes. The remaining steps of the first experiment are then repeated. The flexible, resilient foam sheet which results has a density of about 0.4 lb/ft$^3$. When exposed to an open flame, these foams produce no visible smoke. These foams are found to consist primarily of polyimide.

EXAMPLE II

The procedures of the second experiment of Example 1 are repeated, except that the quantity of hydrous oxalic acid is varied as follows (quantity per 100 g. of powder): (a) 0.001 g., (b) 0.05 g., (c) 1 g., (d) 7 g., (e) 10 g., (f) 20 g., and (g) 50 g. Good low density foam products are produced in all cases except (a) where insignificant density reduction occurs and (f) and (g) where the high concentration of oxalic acid produces flaws and imperfections in the foam. Density of the foam decreases with increases in additive amount, form about 0.7 lb/ft$^3$ for (a) to about 0.3 lb/ft$^3$ for (e).

EXAMPLE III

The second experiment of Example I is repeated with the only change being the substitution of the following hydrous compounds for the hydrated oxalic acid of Example I. The compounds used are: (a) lactose.H$_2$O, (b) hydroxybenzophenone.H$_2$O, (c) m. sulfobenzoic acid.2H$_2$O, (d) p. sulfobenzoic acid.3H$_2$O, (e) o. sulfobenzoic acid.3H$_2$O, (f) trihydroxybenzoic acid.H$_2$O, (g) gallic acid.H$_2$O, and (h) an equal weight mixture of lactose.H$_2$O and oxalic acid.2H$_2$O. IN each case a low density foam results.

EXAMPLE IV

The procedures of Example I are followed with five samples of the material which includes the hydrated oxalic acid, but only up to the heating to foam step. The five dry powder samples are placed in preheated circulating air ovens at the following temperatures for the following time periods: IV(a) about 125° C. for about 40 minutes., IV(b) about 200° C. for about 30 minutes, IV(c) about 220° C. for about 10 minutes, IV(d) about 235° C. for about 30 minutes, and IV(e) about 310° C. for about 30 minutes. Each sample forms a foam of low density, good resiliency and flame resistance. Samples IV(a) and IV(b) are found to be primarily imide-amide and to have outstanding flexibility but lower flame resistance. Example IV(c) is found to be a relatively even mix of imide and amide-imide and to have intermediate flexibility and flame resistance. Examples IV(d) and IV(e) are found to be primarily polyimide and to have less flexibility but outstanding flame resistance. All samples have low density. In general, higher temperatues and longer heating periods produce a greater polyimide proportion and a stiffer foam. The higher temperatures are found to be more significant than the longer heating periods in producing the high percentage of polyimide foams.

EXAMPLE V

The procedures of Example I are repeated using the material with the hydrous oxalic acid additive, except that the following diamines are used in place of the 4,4'-diaminodiphenyl methane: V(a) m-phenylene diamine (0.375M), V(b) 4,4'-diaminodiphenyl sulfone (0.375M), V(c) 4,4'-diaminodiphenyl oxide (0.375M), V(d) 4,4'-diaminodiphenyl oxide (0.1875M) and 4,4'-diaminodiphenyl sulfide (0.1875M). In each case the resulting foam has a uniform cellular structure, low density and has excellent heat and flame resistance. The flexibility and resiliency varies somewhat among the sub-examples.

EXAMPLE VI

The procedures of Example I are repeated using the material with the hydrous oxalic acid additive, with the only change being the substitution of the following oximes for the 0.25M caprolactam specified in Example I: VI(a) 2-pyrrolidone (0.25M), VI(b) 2-piperidone (0.25M), VI(c) caprolactam (0.125M) and 2-piperidone (0.125M). The product in each case is an excellent, low density, flame resistant foam, with slight changes in physical properties with the different oximes.

EXAMPLE VII

About 322 g. (1M) 3,3',4,4'-benzophenone tetracarboxylic acid dianhydride and about 226 g. (2M) caprolactam are added to a 5 liter flask and heated at about 170° C. for about 30 minutes. The mixture is cooled to about 70° C., then about 800 g. of methanol is added. After the esterification reaction product is fully dissolved, an additional about 644 g. (2M) of 3,3',4,4'-benzophenonetetracarboxylic acid dianhydride is added. The material is refluxed until clear and then is cooled to about 45° C. About 297 g. (1.5M) 4,4'-diaminodiphenyl methane and about 192 g. (0.96M) 4,4'-diaminodiphenyl oxide are added and stirred at about 50° C. until dissolved. About 64 g. (0.54M) 1,6-diamine hexane is dissolved in about 100 g. of methanol and added to the mixture while maintaining the mixture at a temperature below about 55° C. The mixture is then heated to about 65° C. and held there for about 10 minutes. About 17 g. of Dow Corning 193, a silicone surfactant, is added to the mixture, which is stirred while cooling to room temperature. The resulting liquid mixture is dried using a high speed atomizer spraying into a chamber preheated to about 75° C. The dried resin is collected and stored at room temperature. About 10 parts by weight lactose.H$_2$O is added to about 100 parts by weight of the resin and the mixture is blended in a mechanical mixer for about 50 minutes. A layer of the powder is placed in a thermal oven (pre-heated to about 200° C.) for about 60 minutes. The powder is observed to first melt, then expand into a very flexible and resilient foam sheet with very uniform cell structure and low density (about 0.4 lb/ft$^3$). This demonstrates the usefulness of aliphatic diamines with the aromatic diamines.

EXAMPLE VIII

The procedures of Example VII are repeated, except that the heating step is accomplished using a microwave oven. The powder is placed in the oven and a power of about 4.0 KW is applied for about 6 minutes. Rapid melting and expansion result, producing an excellent resilient foam after about 6 minutes, with excellent foam rise and low density.

EXAMPLE IX

The procedure of Example VII is repeated except that portions of the powder are placed in two pipe-like molds, one consisting of spaced concentric aluminum tubes and the other of spread concentric glass tubes. The mold surfaces were coated with a conventional silicone mold release. When heated to about 200° C. for about 60 minutes, each foam sample expands to form a pipe or tube of low density foam having densified skins which are impervious to water.

EXAMPLE X

The procedures of Example IX are repeated except that prior to the introduction of the powder, a sheet of fiberglass fabric is placed around the inner tube in one case and against the inner wall of the outer mold tube in the other. Mold release is applied only to the uncovered mold surfaces. After powder introduction and heating, the molds are open, revealing excellent low density foam tubes with densified skins, with the fiberglass fabric wall bonded to the skins. This example shows that production of tubes with a reinforced inner or outer surface.

EXAMPLE XI

The procedures of Exmple I are repeated, except that the mixture of BTDA and caprolactom is not heated prior to the addition of the alcohol. Otherwise, the steps prior to the addition of the alcohol. Otherwise, the steps of Example I are repeated. A good foam product results, but not of the high quality produced in Example I.

Although specific components, proportions and conditions have been specified in the above examples, these may be varied with similar results, where suitable. In addition, other materials may be added to the foamable material, such as fillers, colorants, ultraviolet absorbers, or the like.

Other applications, modifications and ramifications of the present invention will occur to those skilled in the art upon reading the present disclosure. These are intended to be included within the scope of the invention, as defined in the appended claims.

We claim:

1. A resilient, flame resistant modified polyimide foam product produced by the following process steps; reacting an oxime having general formula

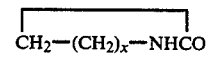

where "x" is a positive integer from 1–5, with an aromatic dianhydride in a mole ratio of oxime to dianhydride up to about 1.5:1 to produce an N-substituted aliphatic imide;

dissolving said imide in a reactive solvent esterifying agent to esterify said imide;

drying the resulting solution to produce a powdered prepolymer;

blending with said powdered prepolymer from about 0.05 to 10 wt. %, based on prepolymer weight, of a hydrated compound which is stable up to at least about 100 C.;

shaping the blended material with a shaping means; and heating said shaped blended material to a selected foaming temperature of from about 120 C. to about 320 C. for a period of from about 10 to 60 minutes; whereby said shaped blended material melts and spontaneously foams producing a foam product.

2. The invention as defined in the claim 1 wherein the product produced by said process is a composite product and is produced by the further step of bonding a reinforcing layer of material to a surface of said foam product with a polyimide resin.

3. The invention as defined in claim 1 wherein said shaping means is a tubular mold.

4. The invention as defined in claim 1 in which the shaping means is an extrusion device, the blend is heated to melt therein, and the resulting foam is conveyed through a die to produce a shaped article.

5. A resilient, flame resistant modified polyimide foam product produced from the following process steps:

reacting an oxime having the general formula

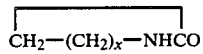

where "x" is an integer from 1 to 5, with an aromatic dianhydride in a mole ratio of oxime to dianhydride up to about 1.5:1 to produce an N-substituted aliphatic imide;

dissolving said imide in a reactive solvent esterifying agent to esterify said imide;

adding thereto a diamine;

drying the resulting solution to produce a powdered prepolymer; and heating the powdered prepolymer to a selected foaming temperature of from about 120 C. to about 320 C. for a period of from about 10 to about 60 minutes; the improvement comprising;

after drying the solution to produce said prepolymer, blending with said powdered prepolymer from about 0.05 to 10 wt. %, based on prepolymer weight, of a hydrated compound which is stable up to a temperature of at least about 100 C.; and shaping the blended material with a shaping means prior to the heating steps.

6. The invention as defined in claim 5 wherein the product produced by said process is a composite product and is produced by the further step of bonding a reinforcing layer of material to a surface of said foam product with a polyimide resin.

7. The invention as defined in claim 5 wherein said shaping means is a tubular mold.

8. The invention as defined in claim 5 wherein the shaping means is an extrusion device, the blend is heated to melt therein, and the resulting foam is conveyed through a die to produce a shaped article.

* * * * *